(12) United States Patent
Haase et al.

(10) Patent No.: US 7,622,833 B2
(45) Date of Patent: Nov. 24, 2009

(54) MACHINE, IN PARTICULAR PRODUCTION MACHINE, MACHINE TOOL AND/OR ROBOT

(75) Inventors: Andreas Haase, Chemnitz (DE);
Wolfram Herrmann, Chemnitz (DE);
Karl-Heinz Smolka, Chemnitz (DE)

(73) Assignee: Siemens Aktiengesellschaft, München (DE)

( * ) Notice: Subject to any disclaimer, the term of this patent is extended or adjusted under 35 U.S.C. 154(b) by 303 days.

(21) Appl. No.: 11/573,603

(22) PCT Filed: Aug. 4, 2005

(86) PCT No.: PCT/EP2005/053839

§ 371 (c)(1),
(2), (4) Date: Jul. 24, 2007

(87) PCT Pub. No.: WO2006/018390

PCT Pub. Date: Feb. 23, 2006

(65) Prior Publication Data

US 2007/0280809 A1      Dec. 6, 2007

(30) Foreign Application Priority Data

Aug. 12, 2004   (DE) .................. 10 2004 039 190

(51) Int. Cl.
*H02K 41/00* (2006.01)
(52) U.S. Cl. .................. 310/12.01; 310/12.19; 318/135
(58) Field of Classification Search ... 310/12.01–12.19, 310/68 B; 318/135, 138
See application file for complete search history.

(56) References Cited

U.S. PATENT DOCUMENTS

| | | | | |
|---|---|---|---|---|
| 4,629,262 A | * | 12/1986 | Hamilton .................. 310/90.5 |
| 4,678,971 A | * | 7/1987 | Kanazawa et al. .......... 318/135 |
| 4,689,529 A | * | 8/1987 | Higuichi ..................... 318/135 |
| 6,316,848 B1 | * | 11/2001 | Rohner et al. ............ 310/12.19 |
| 6,323,935 B1 | * | 11/2001 | Ebihara et al. ................ 355/53 |

(Continued)

FOREIGN PATENT DOCUMENTS

DE      34 23 403 A1      1/1986

(Continued)

*Primary Examiner*—Thanh Lam
(74) *Attorney, Agent, or Firm*—Henry M. Feiereisen; Ursula B. Day

(57) ABSTRACT

A production machine includes an electrical positioning drive having a stator and a moveable member displaceable relative to the stator in at least one travel direction. The moveable member is mounted, in relation to the stator, in a contactless manner by a magnetic field in at least one of the supporting directions differing from the travel direction. A sensor device is associated with the positioning drive to shift the moveable member relative to the stator in the supporting direction to be detected. A control device is also associated with the positioning drive, and the shift of the moveable member is detected by the sensor device and can be supplied in the supporting direction. A control signal for a positioning magnet system can be determined by the control device, on the basis of the shift of the moveable member in the supporting direction and a nominal positioning of the moveable member. The positioning magnet system can monitor the positioning of the moveable member in relation to the stator in the supporting direction in a non-contact manner. The control signal can be emitted to the positioning magnet system by the control device.

7 Claims, 3 Drawing Sheets

U.S. PATENT DOCUMENTS

| | | | |
|---|---|---|---|
| 6,693,401 B1 * | 2/2004 | Schnetzler et al. | 318/625 |
| 6,836,033 B2 * | 12/2004 | Gweon et al. | 310/12.06 |
| 6,949,845 B2 * | 9/2005 | Oisugi et al. | 310/12.05 |
| 2003/0132671 A1 * | 7/2003 | Gweon et al. | 310/12 |
| 2004/0089190 A1 | 5/2004 | Ramu et al. | |
| 2005/0116548 A1 * | 6/2005 | Oisugi et al. | 310/12 |

FOREIGN PATENT DOCUMENTS

| | | |
|---|---|---|
| DE | 68908327 T2 | 12/1993 |
| DE | 895 01 251 T2 | 2/1996 |
| DE | 100 23 973 A1 | 11/2001 |
| EP | 0 735 276 A | 10/1996 |
| EP | 1 148 016 A | 10/2001 |
| WO | WO 87/06167 | 10/1987 |

* cited by examiner

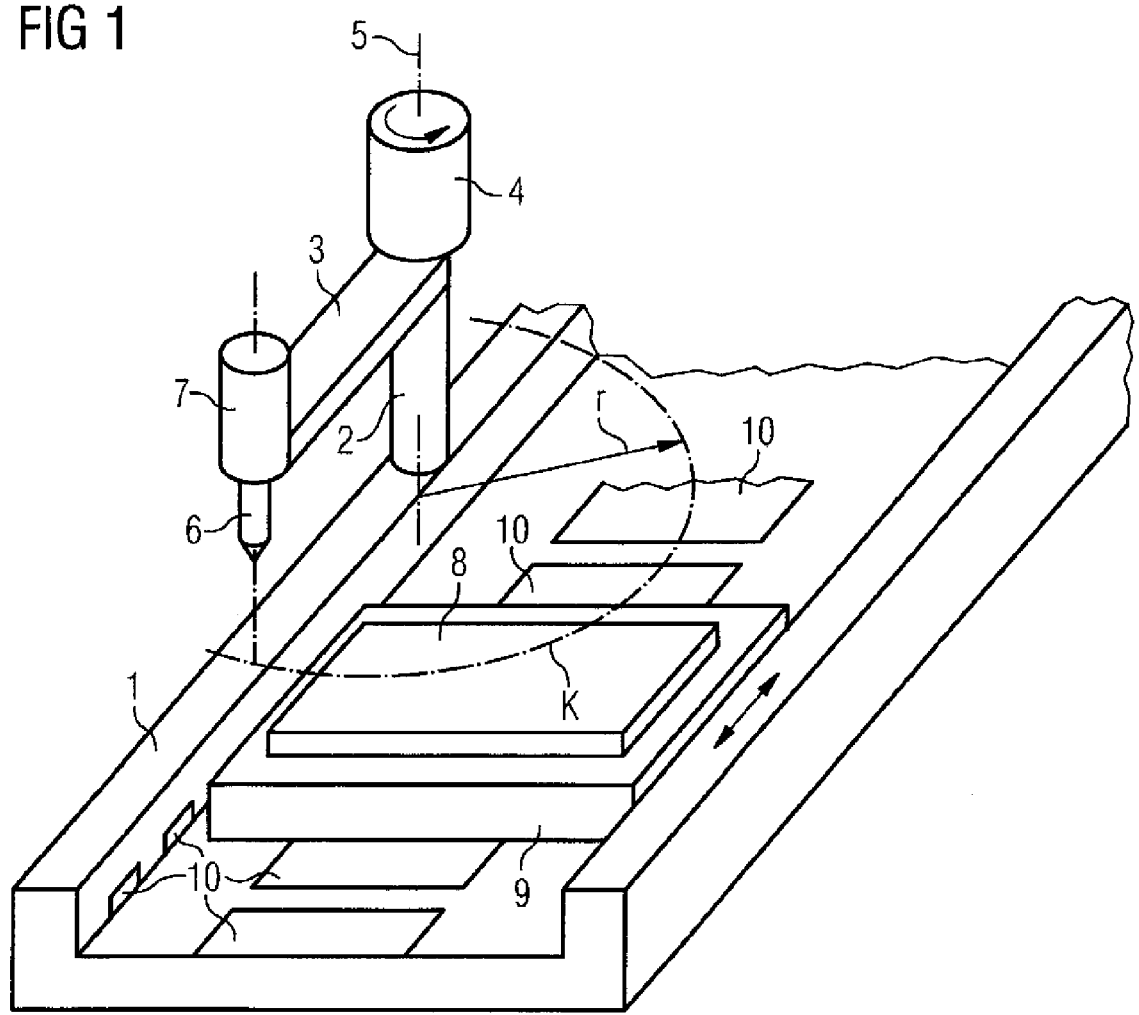
FIG 1
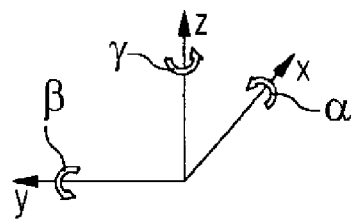

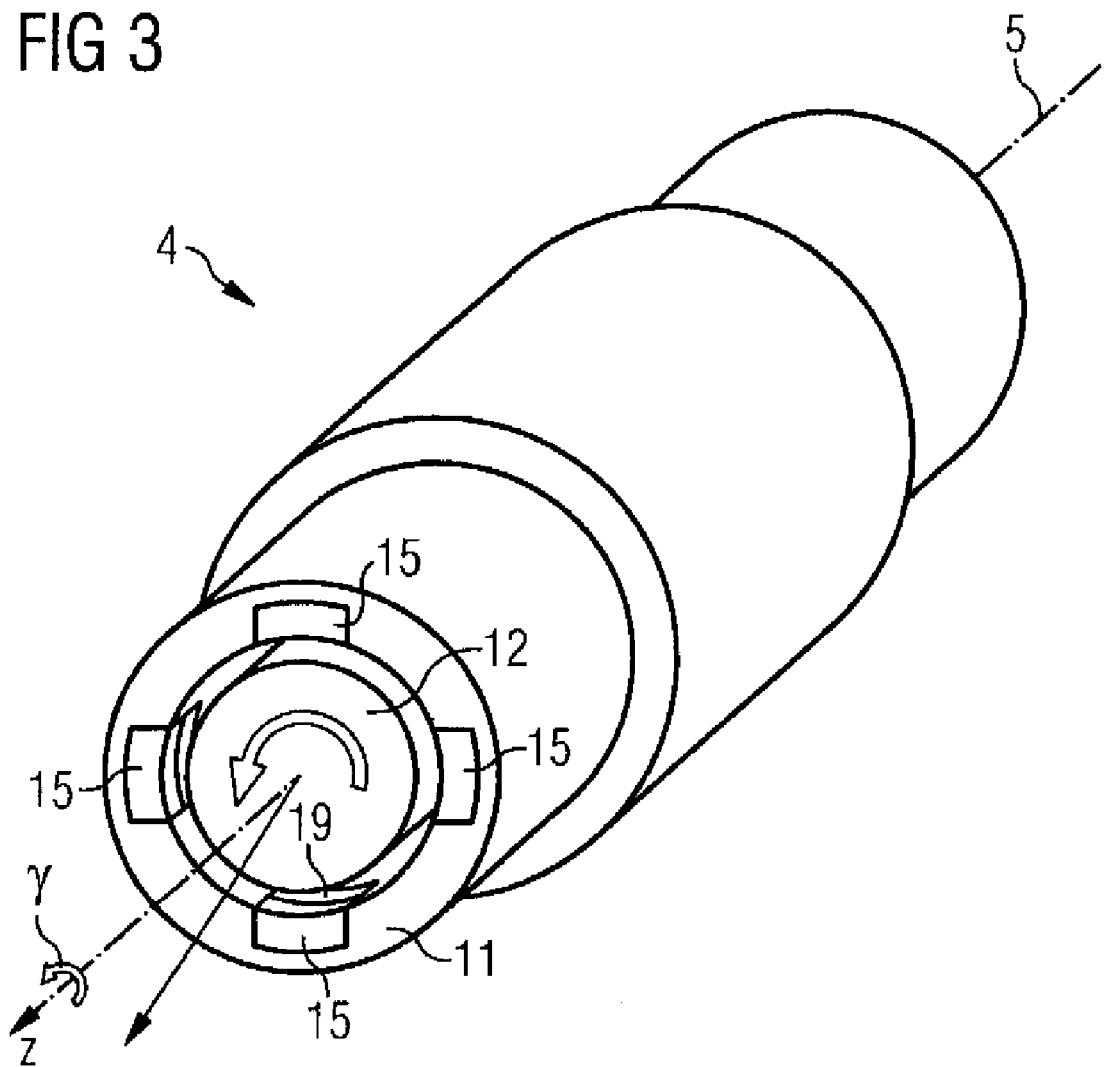

MACHINE, IN PARTICULAR PRODUCTION MACHINE, MACHINE TOOL AND/OR ROBOT

BACKGROUND OF THE INVENTION

The present invention relates to a machine, in particular a production machine, machine tool and/or robot, having at least one electric positioning drive, the positioning drive having a stator and a moveable member which is moveable relative to the stator in at least one travel direction, and the moveable member being supported relative to the stator in at least one supporting direction, which differs from the at least one travel direction, in a non-contact manner by means of a magnetic field.

Machines of the type are generally known.

In many machines, elements which are to be positioned must be moved very accurately. Examples of such machines are production machines, such as for example machine tools, machining stations or injection-molding machines. The elements which are to be positioned are generally moved by means of electric positioning drives. The positioning drives have a stator and a moveable member, with the moveable member being moveable relative to the stator in at least one travel direction. In the positioning drives, the moveable member is generally supported relative to the stator in at least one supporting direction, which differs from the at least one travel direction, in rolling bearings.

Drives are also known in which the moveable member is supported relative to the stator in at least one supporting direction, which differs from the at least one travel direction, in a non-contact manner by means of a magnetic field. The most widely-known use of the technique is in magnetic levitation (transrapid) railways.

Similar positioning drives are also already used in production machines. In the drives, the moveable member is positioned in the supporting direction by means of guide rails, that is to say not without contact. In the prior art, the guidance is considered to be necessary to ensure the required positioning accuracy and strength of the positioning drive. This does not, however, provide the actual advantage, specifically that of freedom from contact of the stator or of elements connected to the stator on one side, and of the moveable member or of elements connected to the moveable member on the other side.

SUMMARY OF THE INVENTION

The object of the present invention is that of designing a machine of the type specified in the introduction in such a way that the positioning accuracy and the strength of the positioning drive are also maintained in the at least one supporting direction, even though the positioning drive is of entirely non-contact design.

The object is achieved in that
the positioning drive is assigned a sensor device, by means of which a displacement of the moveable member relative to the stator in the at least one supporting direction can be detected in a non-contact manner,
the positioning device is assigned a control device to which can be supplied the displacement, as detected by the sensor device, of the moveable member relative to the stator in the at least one supporting direction,
it is possible for the control device to determine, on the basis of the displacement of the moveable member relative to the stator in the at least one supporting direction and a nominal supported position of the moveable member relative to the stator in the at least one supporting direction, an actuating signal for a positioning magnet system and to output the actuating signal to the positioning magnet system,
it is possible for the supported position of the moveable member relative to the stator in the at least one supporting direction to be corrected in a non-contact manner by means of the positioning magnet system. The moveable member can be a linear moveable member. In this case, the at least one travel direction is a linear direction.

It is alternatively possible for the moveable member to be a rotor. The at least one travel direction is in this case a rotational direction.

It is even possible for the positioning drive to be embodied as a combined rotary/lifting drive whose moveable member is both rotatable about an axis and also displaceable along the axis. In this case, the positioning drive has two travel directions, one of which is a linear direction and the other of which is a rotational direction.

Regardless of the type of travel direction, the at least one supporting direction can be a linear direction or a rotational direction. Where the moveable member is embodied as a linear moveable member, the rotational direction can alternatively be either a rotational direction in the narrower sense or a rotational direction in the wider sense. In this case, a rotational direction in the narrower sense is a rotation about the axis determined by the travel direction, while a rotational direction in the wider sense is a tilting of the orientation of the moveable member relative to the travel direction.

The positioning drive generally even has at least two supporting directions, of which at least one is a linear direction and at least one is a rotational direction. This is because, usually, each of the six theoretically possible degrees of freedom of the moveable member (three translatory degrees of freedom+three rotational degrees of freedom) corresponds either to the travel direction or one of the travel directions or to a supporting direction.

BRIEF DESCRIPTION OF THE DRAWING

Further advantages and details can be gathered from the following description of an exemplary embodiment in conjunction with the drawings. In the drawings, in a diagrammatic illustration in each case, FIG. 1 shows a principle design of a production machine,
FIG. 2 shows a principle design of a linear drive and
FIG. 3 shows a principle design of a spindle drive.

DETAILED DESCRIPTION OF PREFERRED EMBODIMENTS

Figure 2:
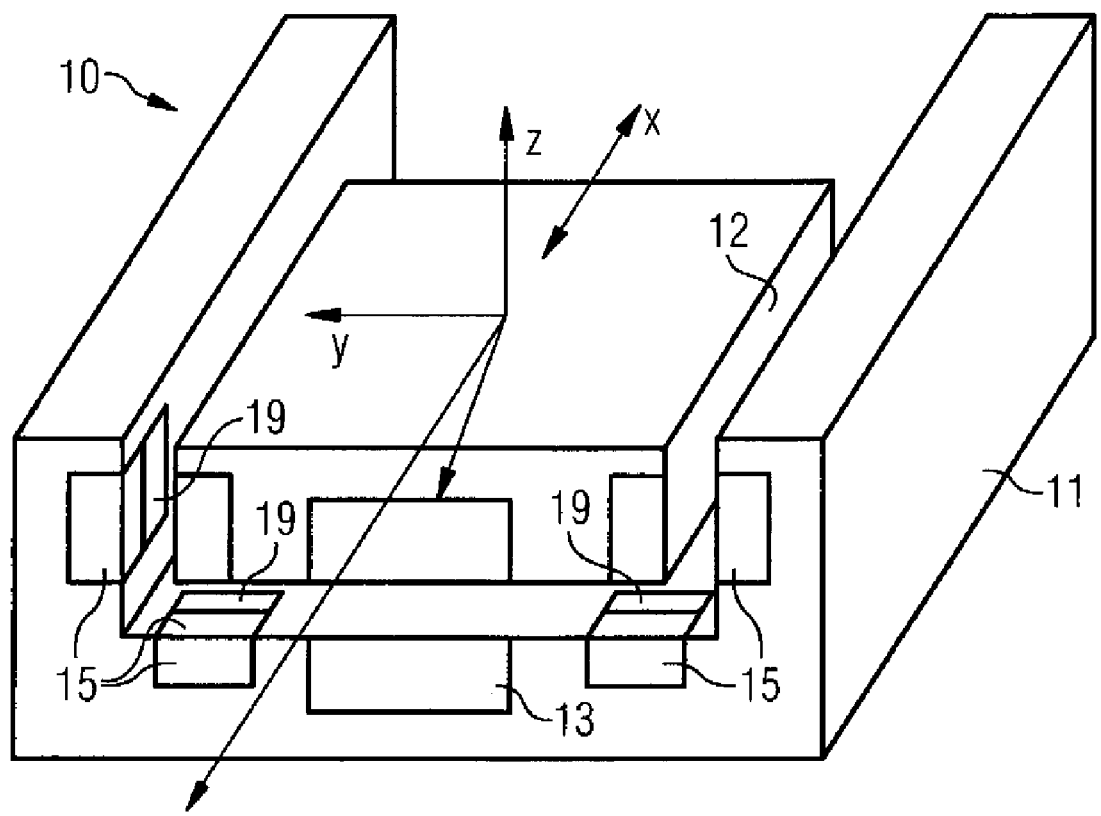
Figure 2:
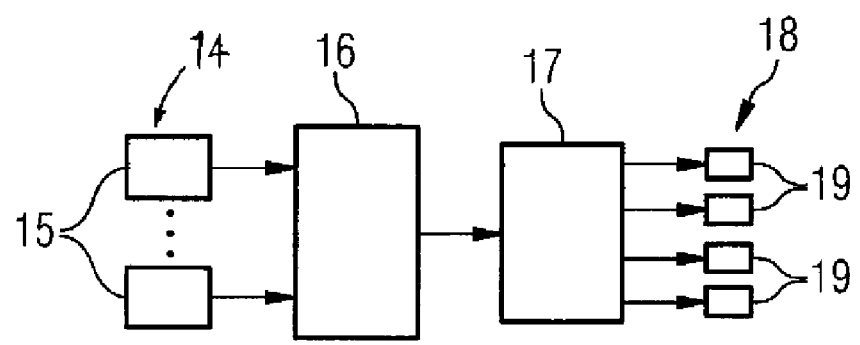

FIG. 1 shows a simple example of a production machine, specifically a machine tool in the form—purely by way of example—of a drilling machine.

In FIG. 1, the machine tool has a base body 1. The base body 1 carries a main column 2. Supported on the main column 2 is a pivot arm 3. The pivot arm 3 can be pivoted about a pivot axis 5 by means of a first electric positioning drive 4. The first positioning drive 4 is therefore a rotary drive. The pivot arm 3, at its radially outer end, carries a drilling spindle 6 which is provided with a rotary drive 7. As a result of the pivoting capability of the pivot arm 3, the drilling spindle 6 can therefore be moved along a circle K whose radius r corresponds to the distance of the drilling spindle 6 from the pivot axis 5.

It is possible by means of the drilling spindle 6 to form bore holes in a workpiece 8. Here, the bore holes are formed by lowering the drilling spindle 6. The drilling spindle 6 can be lowered alternatively by means of either the first positioning drive 4 or another drive which, for clarity, is not illustrated in FIG. 1. If the drilling spindle 6 is lowered by means of the first positioning drive 4, the positioning drive 4 is embodied as a combined rotary/lifting drive.

The workpiece 8 to be machined is fastened to a tool table 9. The tool table 9 can be moved linearly along the base body 1 by means of a second electric positioning drive 10.

FIG. 2 then shows the design of the second positioning drive 10 in more detail.

In FIG. 2, the second positioning drive 10 has a stator 11 and a moveable member 12. The moveable member 12 is a linear moveable member which can be moved relative to the stator 11 in a linear travel direction x. The stator 11 is rigidly connected to the base body 1, for example is integrated into the base body 1. The moveable member 12 is rigidly connected to the tool table 9, for example is integrated into the tool table 9. The second positioning drive 10 is therefore a linear drive, by means of which the tool table 9 can be moved relative to the base body 1 along the linear travel direction x.

The moveable member 12 is supported relative to the stator 11 transversely with respect to the travel direction x of the second positioning drive 10, that is to say in the supporting directions y and z, in a non-contact manner by means of a magnetic field. Here, the magnetic field is generated by powerful electromagnets 13 which serve both to support the moveable member in a non-contact manner and to drive the moveable member 12.

As a result of the non-contact support of the moveable member 12 relative to the stator 11, it can occur that the moveable member 12 is displaced relative to the stator 11 not only in the travel direction x but also in the supporting directions y, z. Here, not only purely linear displacements in the supporting directions y and z, but rather also a rotation of the tool table 9 about one or more of the directions x, y, z, that is to say in the rotational directions $\alpha$, $\beta$, or $\gamma$, are possible.

A sensor device 14 is provided in order to detect such displacements. The sensor device 14 has, for example, a plurality of individual sensors 15 and an evaluation device 16. Each sensor 15 detects, in a non-contact manner, a distance of the tool table 9 from the base body 1 or of the moveable member 12 from the stator 11. The distance for example can be detected by means of an ultrasound propagation time measurement or inductively. Other methods of distance detection are also conceivable.

The sensors 15 are for example arranged, as per FIG. 2, in the supporting direction y at either side, and in the supporting direction z below, the moveable member 12. The sensors 15 are preferably spaced apart from one another in the travel direction x in such a way that it is possible by means of the sensors 15 not only to detect the position of the moveable member 12 in the travel direction x and the mean displacement of the moveable member 12 in the supporting directions y and z. Moreover, the sensors 15 are preferably spaced apart from one another in the travel direction x in such a way that it is possible by means of the sensors 15 to also detect tilt angles $\beta$, $\gamma$ of the moveable member 12 about the y axis and the z axis, and a rotation a of the moveable member 12 about the x axis.

When fully evaluating the signals delivered by the sensors 15, the evaluation device 16 thus determines not only linear displacements of the moveable member 12 in the supporting directions y and z but also a rotation of the moveable member 12 about the travel direction x and the supporting directions y, z. Where accuracy requirements are relatively low, it can in particular cases be sufficient for alternatively only the linear displacements in the supporting directions y and z or only the rotation a and the tilt angles $\beta$, $\gamma$ to be determined.

The detected or determined displacements of the moveable member 12 are supplied, as per FIG. 2, to a control device 17 which is likewise assigned to the second positioning drive 10. The control device 17 compares the displacements supplied to it with a corresponding nominal supported position of the moveable member 12. Here, the nominal supported position can alternatively be constant, dependent on the position of the moveable member 12 in the travel direction x, dependent on the positioning of other elements of the tool machine, or be externally supplied to the control device 17. A combined dependency both of the position of the moveable member 12 in the travel direction x and of the position of other elements of the tool machine is also conceivable. As a result of the comparison, the control device 17 determines an actuating signal for a positioning magnet system 18 which is likewise assigned to the second positioning drive 10. The positioning magnet system 18 preferably has a plurality of electric magnets 19, with it being possible for each electromagnet 19 to be actuated individually. Here, it is preferable for each sensor 15 to be assigned precisely one electromagnet 19.

The control device 17 outputs the actuating signal which it determines to the positioning magnet system 18. The positioning magnet system 18 thereupon corrects, in a non-contact manner, the supported position of the moveable member 12 relative to the stator 11 in the supporting directions y, z, $\alpha$, $\beta$, $\gamma$ in accordance with the given actuating signal.

FIG. 3 now shows, in more detail, the design of the first positioning drive 4. The design of the first positioning drive 4 corresponds in principle to the design of the second positioning drive 10. The single substantial difference is that the moveable member 12 is not a linear moveable member but a rotor. Accordingly, the travel direction $\gamma$ of the first positioning drive 4 is a rotational direction $\gamma$, specifically about the pivot axis 5, and not a linear direction x, y, z.

As a result of the design of the first electric positioning drive 4, in order to detect displacements of the moveable member 12 in the supporting directions y and z and in order to detect tilt angles $\alpha$, $\beta$ of the moveable member 12 about the pivot axis 5, it is sufficient to detect the displacement of the moveable member 12 in the supporting directions y and z at each of the two axially spaced-apart ends of the moveable member 12. The mean value of the measurement values then gives the linear displacement in the supporting directions y and z, and the difference in connection with the axial spacing of the corresponding sensors 15 gives the tilt angles $\alpha$ and $\beta$.

Even in the case of the embodiment as per FIG. 3, it can in individual cases be sufficient to detect and evaluate only the purely linear displacements of the moveable member 12 or else only the pure tilt angles of the moveable member 12. Detection and evaluation both of linear supporting directions y, z and also of rotational directions $\alpha$, $\beta$ is however preferred as a rule.

As indicated in FIG. 1, it is also possible for the first positioning drive 4 to be embodied as a combined rotary/lifting drive 4. In this case, the moveable member 12 is both rotatable about the pivot axis 5 and displaceable along the pivot axis 5, that is to say in the z direction. Accordingly, the first positioning drive 4 in this case has two travel directions z, $\gamma$, with one of the two travel directions z, $\gamma$ being a linear direction z and one of the two travel directions z, $\gamma$ being a rotational direction $\gamma$.

Even in drives of the type, it is possible to detect displacements of the moveable member 12 and to compensate the supported position of the moveable member 12 by means of correction. In this case, a plurality of sensor groups and electromagnet groups must be arranged as viewed in the direction z of the pivot axis 5 or, more generally, of the axis of the rotary/lifting drive 4. Here, each sensor group is constructed as described above in conjunction with FIG. 3. The electromagnets 19 of each electromagnet group are also arranged as illustrated in FIG. 3. The axial spacing of the sensor groups and electromagnet groups should preferably be dimensioned such that the position or displacement of the moveable member 12 can be detected independently of the axial position of the moveable member 12, in this case in the z direction, at all times by means of two sensor groups, and can be influenced by means of at least two electromagnet groups. This is because both linear displacements and tilt angles of the moveable member 12 can then, even in this case, be detected and compensated at all times.

Highly precise positioning of the workpiece 8 is therefore possible at all times by means of the electric machine according to the invention, even though the associated positioning drives 4, 10 are embodied as magnetic-field-supported drives 4, 10 which operate in a non-contact manner.

What is claimed is:

1. A production machine, in particular a machine tool and/or robot, comprising:
    at least one electric positioning drive comprising a stator and a moveable member moveable relative to the stator in at least one travel direction, wherein the moveable member is contactless supported relative to the stator by a magnetic field in at least one support direction that is different from the at least one travel direction,
    a sensor device operatively connected with the at least one positioning drive for contactless detection of an actual displacement of the moveable member relative to the stator in the at least one support direction,
    a control device operatively connected with the at least one positioning device and receiving the actual displacement of the moveable member relative to the stator in the at least one support direction detected by the sensor device, wherein the control device determines from the actual displacement and a desired support position of the moveable member relative to the stator an actuating signal,
    a positioning magnet system receiving from the control device the actuating signal and contactless correcting the actual displacement of the moveable member relative to the stator in the at least one support direction based on the actuating signal.

2. The production machine of claim 1, wherein the moveable member is a linear moveable member and the at least one travel direction is a linear direction.

3. The production machine of claim 1, wherein the moveable member is a rotor and the at least one travel direction is a rotational direction.

4. The production machine of claim 1, wherein the moveable member of the at least one positioning drive is implemented as a combined rotary/lifting drive defining an axial direction, wherein the moveable member is both rotatable about the axis and linearly displaceable along the axis.

5. The production machine of claim 1, wherein the at least one support direction is a linear direction.

6. The production machine of claim 1, wherein the at least one support direction is a rotational direction.

7. The production machine of claim 1, wherein the at least one positioning drive has at least two support directions and wherein at least one of the support directions is a linear direction and at least one of the support directions is a rotational direction.

* * * * *